US011180637B2

(12) United States Patent
Anim-Danso et al.

(10) Patent No.: US 11,180,637 B2
(45) Date of Patent: Nov. 23, 2021

(54) POLYPHENYLENE SULFIDE POLYMER COMPOSITIONS AND CORRESPONDING ARTICLES

(71) Applicant: SOLVAY SPECIALTY POLYMERS USA, LLC, Alpharetta, GA (US)

(72) Inventors: Emmanuel Anim-Danso, Atlanta, GA (US); Alessandro Bongiovanni, Arese (IT); Philippe Martin, Moxhe (BE)

(73) Assignee: Solvay Specialty Polymers USA, LLC, Alpharetta, GA (US)

( * ) Notice: Subject to any disclaimer, the term of this patent is extended or adjusted under 35 U.S.C. 154(b) by 21 days.

(21) Appl. No.: 16/619,295

(22) PCT Filed: May 24, 2018

(86) PCT No.: PCT/EP2018/063586
§ 371 (c)(1),
(2) Date: Dec. 4, 2019

(87) PCT Pub. No.: WO2018/224314
PCT Pub. Date: Dec. 13, 2018

(65) Prior Publication Data
US 2020/0115528 A1 Apr. 16, 2020

Related U.S. Application Data

(60) Provisional application No. 62/592,956, filed on Nov. 30, 2017, provisional application No. 62/516,929, filed on Jun. 8, 2017.

(51) Int. Cl.
*C08K 7/14* (2006.01)
(52) U.S. Cl.
CPC ..................................... *C08K 7/14* (2013.01)
(58) Field of Classification Search
CPC ........................................................ C08K 7/14
See application file for complete search history.

(56) References Cited

U.S. PATENT DOCUMENTS

| 4,748,169 A | * | 5/1988 | Izutsu | ..................... C08L 81/02 524/500 |
| 5,049,446 A | | 9/1991 | Blackwell et al. | |
| 2004/0220337 A1 | | 11/2004 | Tsutsumi et al. | |
| 2009/0057624 A1 | * | 3/2009 | Elkovitch | ............... C08L 71/12 252/511 |

FOREIGN PATENT DOCUMENTS

EP 1630201 A1 3/2006

OTHER PUBLICATIONS

Advantex® Boron-Free E-CR Glass Reinforcement Properties Product Data Sheet obtained at https://cdn2.hubspot.net/hubfs/213842/Enduro_November2019/pdf/Advantex_ECR_glass_properties_ww_201004_web.pdf (Year: 2010).*
Press Release "At JEC 2014, 3B-the fibreglass company Launches DS 8800-11P a new food contact chopped strands glass fibre grade for reinforcement of high temperature" Belgium. Mar. 2014. (Year: 2014).*
Item V Continued Press Release Obtained at https://www.3b-fibreglass.com/press/jec-2014-3b-fibreglass-company-launches-ds-8800-11p-new-food-contact-chopped-strands-glass (Year: 2014).*
Standard ASTM D1238-04, "Standard Test Method for Melt Flow Rates of Thermoplastics by Extrusion Plastometer", 2004, p. 1-13.

* cited by examiner

*Primary Examiner* — Arrie L Reuther
(74) *Attorney, Agent, or Firm* — Osha Bergman Watanabe & Burton LLP

(57) ABSTRACT

Described herein are polyphenylene sulfide ("PPS") polymer compositions including a low MFR PPS polymer and E-CR glass fibers. It was surprisingly discovered that the PPS polymer compositions had significantly improved retention of tensile strength and tensile elongation after water aging ("water aging performance"), relative to corresponding PPS polymer compositions having E glass fibers instead of the E-CR glass fibers. Moreover, it was also discovered that PPS polymer compositions including E-CR glass fibers in conjunction with a low MFR PPS polymer and a high MFR PPS polymer had unexpected synergies with respect to water aging performance, relative to corresponding polymer compositions including E-CR glass fibers and either a low MFR PPS polymer or a high MFR PPS. Due at least in part to the improved water aging performance, the PPS polymer compositions can be advantageously incorporated into application settings where the polymer composition is in contact with water. Examples include, but are not limited to, drinking water applications.

16 Claims, No Drawings

POLYPHENYLENE SULFIDE POLYMER COMPOSITIONS AND CORRESPONDING ARTICLES

CROSS-REFERENCE TO RELATED APPLICATIONS

This application claims priority to U.S. provisional patent applications No. 62/516,929, filed Jun. 8, 2017, and 62/592,956, filed Nov. 30, 2017, the whole content of each of these application being incorporated herein by reference for all purposes.

TECHNICAL FIELD OF THE INVENTION

The invention relates to polyphenylene sulfide polymer compositions having significantly improved water aging properties. The invention further relates to articles incorporating the polyphenylene sulfide polymer compositions.

BACKGROUND OF THE INVENTION

Reinforced polyphenylene sulfide ("PPS") polymer compositions are advantageously used in applications setting in which the PPS polymer is in contact with water. In general, the PPS polymer compositions are reinforced with E-glass fiber, to provide for a PPS polymer composition having high strength (e.g. tensile strength), in addition to the inherently desirable chemical resistance of the composition. Due to the high strength and desirable chemical resistance, such compositions are especially desirable in drinking water applications. However, after prolonged contact with water, the strength of the PPS polymer composition degrades significantly, requiring replacement of the corresponding part including the PPS polymer composition. Accordingly, there is an ever present desire to increase the retention of mechanical properties of reinforced PPS polymer compositions during prolonged contact with water.

DETAILED DESCRIPTION OF THE INVENTION

Described herein are polyphenylene sulfide ("PPS") polymer compositions including a low melt flow rate ("MFR") PPS polymer and E-CR glass fibers. It was surprisingly discovered that the PPS polymer compositions had significantly improved retention of tensile strength and tensile elongation at break after water aging ("water aging performance"), relative to corresponding PPS polymer compositions having E-glass fibers instead of the E-CR glass fibers ("analogous PPS polymer compositions"). Moreover, it was also discovered that PPS polymer compositions including E-CR glass fibers in conjunction with a low MFR PPS polymer and a high MFR PPS polymer had unexpected synergies with respect to water aging performance, relative to corresponding polymer compositions including E-CR glass fibers and either a low MFR PPS polymer or a high MFR PPS polymer. Due at least in part to the improved water aging performance, the PPS polymer compositions can be advantageously incorporated into application settings where the polymer composition is in contact with water. Examples include, but are not limited to, drinking water applications.

As noted above the PPS polymer composition has improved retention of tensile strength and improved retention of tensile elongation at break after water aging. For ease of reference, tensile elongation at break is sometimes referred to as "tensile elongation." During water aging, an ISO 527-2 tensile bar molded from the PPS polymer composition in submersed in deionized water and maintained at a temperature of 135° C. for a selected period of time. Water aging is described in more detail in the Examples. Retention of tensile strength refers to 100 times the difference in (1) the tensile strength of an as molded (e.g. no water aging) ISO 527-2 tensile bar molded from the PPS polymer composition and (2) the tensile strength of an ISO 527-2 tensile bar molded from the PPS polymer composition after water aging for a selected amount of time, relative to the tensile strength of the as molded ISO 527-2 tensile bar molded from the PPS polymer composition. As defined, a lower value of the retention of tensile strength indicates a lesser change to the tensile strength during water aging. In some embodiments, the PPS polymer has retention of tensile strength after 250 hours of water aging of no more than 30%, preferably no more than 28%, more preferably no more than 26%, even more preferably no more than 24%, still more preferably no more than 22%, most preferably no more than 20%. In some embodiments, the PPS polymer has a retention of tensile strength after 500 hours of water aging of no more than 30%, preferably no more than 25%, most preferably no more than 23%. In some embodiments, the PPS polymer has a retention of tensile strength after 1000 hours of water aging of no more than 34%, preferably no more than 30%, even more preferably no more than 28%, still more preferably no more than 27%.

Similarly, retention of tensile elongation refers to 100 times the difference in (1) the tensile elongation of an as molded ISO 527-2 tensile bar molded from the PPS polymer composition and (2) the tensile elongation of an ISO 527-2 tensile bar molded from the PPS polymer composition after water aging for a selected amount of hours at 135° C., relative to the tensile elongation of the as molded ISO 527-2 tensile bar molded from the PPS polymer composition. As defined, a lower value of the retention of tensile elongation indicates a lesser change to the tensile elongation during water aging. In some embodiments, the PPS polymer composition has a retention of tensile elongation after 250 hours of water aging of no more than 35%, preferable no more than 30%, most preferably no more than 25%. In some embodiments, the PPS polymer composition has a retention of tensile elongation after 500 hours of water aging of no more than 35%, preferably no more than 30%, more preferably no more than 25%, most preferably no more than 20%. In some embodiments, the PPS polymer composition has a retention of tensile elongation after 1000 hours of water aging, of no more than 30%, preferably no more than 25%.

The PPS polymer compositions described herein have, in addition to improved retention of tensile strength and retention of tensile elongation, desirable tensile strength and tensile resistance. In some embodiments, the PPS polymer composition can have a tensile strength of at least 120 mega Pascals ("MPa"), preferably at least 140 MPa, more preferably at least 160 MPa, still more preferably at least 170 MPa, even more preferably at least 175 MPa, still more preferably at least 180 MPa, even more preferably at least 185 MPa, most preferably at least 190 MPa. Tensile strength can be measured as described in the Examples below. Additionally or alternatively, in some embodiments, the PPS polymer composition has a tensile elongation at break of at least 1%, preferably at least 1.5%, most preferably at least 1.6%. Tensile elongation at break can be measured as described in the Examples.

The PPS Polymers

The PPS polymer composition includes a low MFR PPS polymer and, optionally, a high MFR PPS polymer. A PPS polymer refers to any polymer having at least 50 mol % of a recurring unit ($R_{PPS}$), relative to the total number of recurring units in the PPS polymer. In some embodiments, the PPS polymer has at least 60 mol %, at least 70 mol %, at least 80 mol %, at least 90 mol %, at least 95 mol % or at least 99 mol % recurring unit ($R_{PPS}$), relative to the total number of recurring units in the PPS polymer. Recurring unit ($R_{PPS}$) is represented by the following formula:

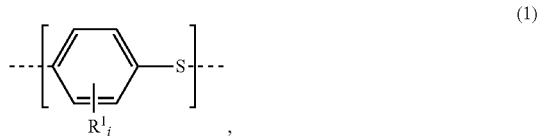

(1)

where $R^1$, at each location, is independently selected from the group consisting of an alkyl, an aryl, an alkoxy, an aryloxy, an alkylketone, an arylketone, a fluoroalkyl, a fluoroaryl, a bromoalkyl, a bromoaryl, a chloroalkyl, a chloroaryl, an alkylsulfone, an arylsulfone, an alkylamide, an arylamide, an alkylester, an arylester, a fluorine, a chlorine, and a bromine; and i is an integer from 0 to 4, preferably 0. As used herein, a dashed bond indicates a bond to an atom outside the recurring unit. For example, the dashed bond can be a bond to an identical recurring unit, a different recurring unit, or an atom of a non-recurring unit (e.g. an end-capper). The PPS polymer can include one or more additional recurring units ($R^*_{PPS}$) according to Formula (1). In such cases, each additional recurring unit ($R^*_{PPS}$) is distinct from each other and from recurring unit ($R_{PPS}$). In embodiments including one or more additional recurring units ($R^*_{PPS}$), the total concentration of recurring unit ($R_{PPS}$) and one or more additional recurring units ($R^*_{PPS}$), is at least 50 mol % and, in some embodiments, at least 60 mol %, at least 70 mol %, at least 80 mol %, at least 90 mol %, at least 95 mol % or at least 99 mol %, relative to the total number of recurring units in the PPS polymer. For clarity, in embodiments including both a low MFR PPS polymer and a high MFR PPS polymer, the low MFR PPS polymer contains at least 50 mol % of a recurring unit ($R_{PPS}$) according to Formula (1) and the high MFR PPS polymer contains at least 50 mol % of a recurring unit according to Formula (1), which can be the same or different that recurring unit ($R_{PPS}$) of the low MFR PPS polymer.

As used herein, a low MFR PPS polymer has a melt flow rate of no more than 170 grams/10 minutes ("g/10 min."), preferably no more than 150 g/10 min., more preferably no more than 140 g/10 min., most preferably no more than 130 g/10 min. In some embodiments, additionally or alternatively, the low MFR PPS polymer has a melt flow rate of at least 50 g/10 min., preferably at least 60 g/10 min., more preferably at least 65 g/10 min., most preferably at least 70 g/10 min. As noted above, in some embodiments, the PPS polymer composition includes a high MFR PPS polymer in addition to the low MFR PPS polymer. As used here, a high MFR PPS polymer has a melt flow rate of at least 700 g/10 min., preferably at least 900 g/10 min., most preferably at least 1000 g/10 min. In some embodiments, additionally or alternatively, the high MFR PPS polymer has a melt flow rate of no more than 2500 g/10 min., preferably no more than 2200 g/10 min., most preferably no more than 2000 g/10 min. As used herein, melt flow rate refers to the melt flow rate at 316° C., measured using a 5 kilogram ("kg") weight according to ASTM D1238B.

The total concentration of the low MFR PPS polymer and the high MFR PPS polymer can be at least 30 wt. %, preferably at least 35 wt. %, most preferably at least 40 wt. %. Additionally or alternatively, the total concentration of the low MFR PPS polymer and high MFR PPS can be no more than 65 wt. %, preferably no more than 60 wt. %, most preferably no more than 55 wt. %. For clarity, in embodiments in which the high MFR PPS polymer is not present, the aforementioned concentration ranges refer the concentration of the low MFR PPS polymer. As used herein, wt. % is relative to the total weight of the PPS polymer composition, unless explicitly noted otherwise. In some embodiments in which the PPS polymer composition includes the low MFR PPS polymer and the high MFR PPS polymer, the relative concentration of the low MFR PPS polymer to the high MFR PPS polymer is from 1:1 to 3:1, preferably 1:1 to 2.5:1, more preferably 1:1 to 2:1, most preferably 1:1 to 1:1.5.

The E-CR Glass Fiber

The polymer composition includes an E-CR glass fiber. E-CR glass fiber is a boron-free modified E-Glass fiber, used for improved resistance to corrosion by most acids and as defined according to ASTM D578/D578M-05 (2011). In some embodiments, the concentration of the E-CR glass fiber is from 30 wt. % to 60 wt. %, preferably from 35 wt. % to 55 wt. %.

In addition to silica, alumina and oxides of calcium and magnesium, E glass fiber includes boron (generally as boric oxide). The general composition of E-glass fibers is standardized according to ASTM D578/D578M-05 (2011). Boric oxide is included to help reduce the melt viscosity of the glass, thereby allowing the glass fiber to be fabricated at lower processing temperatures. In general, the concentration of boric oxide in the glass fiber is at least 2 wt. %, and can be as high as 8 wt. % or even higher, relative to the total weight of the glass fiber. In some embodiments, E glass fibers further include fluoride as a fluxing agent to aid in the fiber forming process.

In contrast, E-CR glass fibers are free of boron and, optionally fluoride free. As used herein, a glass fiber free of boron has a boron concentration of less than 1 wt. %, preferably less than 0.5 wt. %, more preferably less than 0.1 wt. %, even more preferably less than 0.05 wt. %, still more preferably less than 0.03 wt. %, most preferably less than 0.02 wt. %, relative to the total weight of the glass fiber. As used herein, a glass fiber free of fluoride has a fluoride concentrate of less than 0.04 wt. %, preferably less than 0.01 wt. %, relative to the total weight of the glass fiber. Boron concentration and fluoride concentration can be measured by inductively coupled plasma-atomic emission spectrometry ("ICP-AES"), as described in the Examples.

In the absence (or very small concentrations) of boric oxide, E-CR glass fibers further include titanium dioxide to reduce the melt viscosity of the glass fiber. In some embodiments, the concentration of titanium in the glass fiber is at least 0.1 wt. %, preferably at least 0.15 wt. %, most preferably at least 0.17 wt. %, relative to the total weight of the E-CR glass fiber. In some embodiments, additionally or alternatively, the E-CR glass fiber has a titanium concentration of no more than 0.25 wt. %, preferably no more than 0.20 wt. %, most preferably 0.19 wt. %, relative to the total weight of the glass fiber. Titanium concentration can be measured by ICP-AES.

In some embodiments, additionally to the titanium dioxide, the E-CR glass fibers can further include potassium oxide as a fluxing agent. In some such embodiments, the E-CR glass fiber has a potassium concentration of at least 0.2 wt. %, preferably at least 0.25 wt. %, more preferably at least 0.3 wt. %, most preferably at least 0.35 wt. %, relative to the total weight of the E-CR glass fiber. In some embodiments, additionally or alternatively, the E-CR glass fiber has a potassium concentration of no more than 0.5 wt. %, preferably no more than 0.45 wt. %, relative to the total weight of the E-CR glass fiber. Potassium concentration can be measured by ICP-AES.

In some embodiments, the E-CR glass fibers have a reduced sodium oxide concentration, relative to E-glass fibers. In some such embodiments, the E-CR glass fiber has a sodium concentration of less than 0.5 wt. %, preferably less than 0.3 wt. %, more preferably less than 0.1 wt. %, most preferably less than 0.05 wt. %, relative to the total weight of the E-CR glass fiber. Additionally or alternatively, in some embodiments, the E-CR glass fiber has a sodium concentration of at least 0.01 wt. %, preferably at least 0.02 wt. %. In some embodiments, the E-CR glass fiber has a strontium concentration of less 0.1 wt. %, preferably less than 0.07 wt. %, more preferably less than 0.05 wt. %, most preferably less than 0.02 wt. %, relative to the total weight of the E-CR glass fiber. Additionally or alternatively, in some embodiments, the E-CR glass fiber has a strontium concentration of at least 0.01 wt. %. Sodium and strontium concentration can be measured by ICP-AES.

Additives

In addition to the PPS polymer and the E-CR glass fiber, the PPS polymer composition can optionally include reinforcing fillers; lubricants; processing aids; plasticizers; flow modifiers; flame retardants; anti-static agents; extenders; pigments, dyes or colorants; and metal deactivators.

When present to total concentration of additives can be from 0.1 wt. % to 10 wt. %, preferably to 5 wt. %, most preferably to 2 wt. %, relative to the total weight of the PPS polymer composition.

Articles

As noted above, at least in part due to the improved water aging performance to the PPS polymer compositions described herein, the PPS polymer compositions can be desirably incorporated into drinking water applications settings as well as automotive application settings. With respect to drinking water applications, in some such embodiments a plumbing fixtures include the PPS polymer composition. In some such embodiments, the plumbing fixture can be selected from the group consisting of a water pump, a water meter, a faucet, a valve, a manifold, a spout and a pipe. With respect to automotive applications, in some embodiments, an automotive fluid reservoir includes the PPS polymer composition. In general, an automotive fluid reservoir is a container for holding automotive fluid that is delivered to (and optionally returned from) an automobile component. In some such embodiments, the automotive fluid reservoir is selected from the group consisting of an engine coolant reservoir and a windshield wiper fluid reservoir. When incorporated into a drinking water or automotive application settings, the PPS polymer composition is intended to be in contact with water or automotive fluid during expected use of the of the plumbing fixture and automotive fluid reservoir, respectively. Put another way, when used as intended, the PPS polymer composition is in contact with water or automotive fluid when the PPS polymer composition is incorporated into a plumbing fixture and automotive fluid reservoir, respectively.

Should the disclosure of any patents, patent applications, and publications which are incorporated herein by reference conflict with the description of the present application to the extent that it may render a term unclear, the present description shall take precedence.

Examples

These examples demonstrate high temperature water aging performance of the PPS polymer compositions described herein.

To demonstrate water aging performance, several sample compositions were made. Each composition contained a PPS polymer having a melt flow rate of 70 g/10 min. ("low MFR PPS") or 1500 g/10 min. ("high MFR PPS"). Some compositions incorporated glass fiber ("GF"), either E-glass fiber obtained as ThermoFlow® 770 from Johns Manville ("E-GF 1"); E-glass fiber obtained as ECS 03 T779DE from Nippon Electric Glass America ("E-GF 2") or E-CR glass fiber (3B DS 8800-11P from 3B—The Fibreglass Company).

The boron concentration in the glass fibers were measured using ICP-AES. For the ICP-AES analysis, a clean dry plastic container was placed onto an analytical balance, and the balance was zeroed. One half to three gram of sample was weighed and the weight was recorded to 0.0001 g. The sample was then dissolved in hydrofluoric acid. The solution was neutralized with boric hydroxide before testing commenced in the ICP-AES.

ICP-AES analysis was performed using inductively-coupled plasma emission spectrometer Perkin-Elmer Optima 8300 dual view. The spectrometer was calibrated using a set of NIST traceable multi-element mixed standards with analyte concentration between 0.0 and 10.0 mg/L. A linear calibration curve was obtained in a whole range of concentrations with a correlation coefficient better than 0.9999 for each of 48 analytes. The standards were run before and after every ten samples to ensure instrument stability. The results were reported as an average of three replicates. The concentration of elemental impurities in the sample was calculated with the following equation:

$$A=(B*C)/(D)$$

where:
A=concentration of element in the sample in mg/kg
B=element in the solution analyzed by ICP-AES in mg/L
C=volume of the solution analyzed by ICP-AES in mL
D=sample weight in grams used in the procedure.

E-GF1, E-GF2 and E-CR glass fiber had boron concentrations of 1.31 wt. %, 1.53 wt. % and less than 0.019 wt. % boron, respectively.

Some compositions included a high density polyethylene lubricant or a color package containing a blend of dyes. The parameters for each sample composition are listed in Table 1.

TABLE 1

| Component | E1 | E2 | E3 | CE1 | CE2 | CE3 | CE4 |
|---|---|---|---|---|---|---|---|
| Low MFR PPS | 29.08 | 57.08 |  | 29.08 | 55.08 | 29.08 | 100 |
| High MFR PPS | 28 |  | 57.08 | 28 | 2 | 28 |  |
| Lubricant | 0.25 | 0.25 | 0.25 | 0.25 | 0.25 | 0.25 |  |
| Color Package | 1.67 | 1.67 | 1.67 | 1.67 | 1.67 | 1.67 |  |
| E-CR GF | 41 | 41 | 41 |  |  |  |  |
| E-GF 1 |  |  |  | 41 | 41 |  |  |
| E-GF 2 |  |  |  |  |  | 41 |  |

To test water aging performance, ISO tensile bars were formed from the sample compositions according to ISO 527-2, using a mold temperature of 149° C. The tensile bars were placed in a sealed container, which was filled with dionized water and heated to 135° C. in an oven. The tensile bars were maintained at 135° C. for the selected aging time (250 hours or 500 hours or 1000 hours). Subsequent to aging, the tensile bars were removed from the container and wiped dried. Tensile strength ("TS") and elongation at break were measured according to ISO 527-2. Water aging parameters and results of mechanical testing are displayed in Table 2. In Table 2, "Initial" indicates no water aging (mechanical properties were tested after molding ISO tensile bars). In Table 2, ΔE and ΔTS are the relative change in the tensile elongation and tensile strength, respectively, with respect to the corresponding initial values.

TABLE 2

| Raw Materials | E1 | E2 | E3 | CE1 | CE2 | CE3 | CE4 |
|---|---|---|---|---|---|---|---|
| Initial | | | | | | | |
| Elongation (%) | 1.7 | 1.8 | 1.2 | 1.5 | 2 | 1.7 | 4 |
| TS (MPa) | 201 | 186 | 165 | 170 | 180 | 200 | 80 |
| 250 hours | | | | | | | |
| Elongation (%) | 1.3 | 1.2 | 0.86 | 0.96 | 1.1 | 0.91 | |
| ΔE (%) | 23.5 | 33.3 | 28.3 | 36.0 | 45.0 | 46.5 | |
| TS (MPa) | 165 | 151 | 128 | 119 | 111 | 119 | |
| ΔTS (%) | 17.9 | 18.8 | 22.4 | 30.0 | 38.3 | 40.5 | |
| 500 hours | | | | | | | |
| Elongation (%) | 1.4 | 1.2 | 0.9 | 0.95 | 1.1 | 0.9 | |
| ΔE (%) | 17.6 | 33.3 | 25.0 | 36.7 | 45.0 | 47.1 | |
| TS (MPa) | 156 | 145 | 127 | 115 | 107 | 116 | |
| ΔTS (%) | 22.4 | 22.0 | 23.0 | 32.4 | 40.6 | 42.0 | |
| 1000 hours | | | | | | | |
| Elongation (%) | 1.4 | 1.2 | 0.89 | 0.92 | 1 | 0.9 | |
| ΔE (%) | 17.6 | 33.3 | 25.8 | 38.7 | 50.0 | 47.1 | |
| TS (MPa) | 148 | 137 | 120 | 112 | 104 | 115 | |
| ΔTS (%) | 26.4 | 26.3 | 27.3 | 34.1 | 42.2 | 42.5 | |

For the samples tested, samples having E-CR glass fiber had surprisingly improved water aging performance relative to samples having E glass fiber. With respect to retention of tensile strength, sample CE2 (E glass fiber) had a relative change in tensile strength of 38.3%, 40.6% and 42.2% after 250 hours, 500 hours and 1000 hours, respectively, of water aging. On the other hand, sample E2 (E-CR glass) had a relative change in tensile strength of 18.8%, 22.0% and 26.3% after 250 hours, 500 hours and 1000 hours, respectively, of water aging. That is, the sample with E-CR glass (E2) showed a 19.5%, 18.6% and 15.9% difference (improvement) in retention of tensile strength after 250 hours, 500 hours and 1000 hours, respectively, relative to sample CE2. Additionally, sample E2 also had increased tensile strength relative to sample CE2 initially and, therefore, also after water aging. Similar results were seen for sample E1 by comparison with sample CE1.

With respect to retention of tensile elongation, not only were similar results obtained as described with respect to tensile strength above, but after 500 hours and 1000 hours of water aging, the samples including E-CR glass fiber had the same or improved retention of tensile elongation. For example, sample E2 (E-CR glass fiber) had a 11.7% improvement in retention of tensile elongation relative sample CE2 (E glass fiber), after both 250 hours and 500 hours of water aging, and an improvement of 16.7% after 1000 hours of water aging. Similarly, sample E1 (E-CR glass fiber) had a 12.5%, 19.1% and 21.1% improvement in the retention of tensile elongation after, respectively, 250 hours, 500 hours and 1000 hours of water aging, relative to sample CE1 (E glass fiber). Furthermore, sample E1 had a greater initial tensile elongation relative to sample CE1. Moreover, after 500 hours and 1000 hours of water aging, samples E1 to E3 (E-CR glass fiber) all showed improved (lower) or the same retention of tensile elongation relative to the corresponding values after 250 hours of water aging. On the other hand, after 500 hours and 1000 hours of water aging, samples CE1 to CE3 (E glass fiber) all showed the same or reduced retention of tensile elongation relative to the corresponding values after 250 hours of water aging.

The samples also demonstrated unexpected synergies in the combination of low MFR PPS and high MFR PPS with E-CR glass fibers. Referring again to Table 2, with respect to tensile strength, sample E2 (low MFR PPS) had an initial tensile strength of 186 MPa and sample E3 (high MFR PPS) had an initial tensile strength of 165 MPa. However, the initial tensile strength of sample E1 (low MFR PPS and high MFR PPS) was 201 MPa, demonstrating an 8.06% and 21.8% improvement in initial tensile strength relative to samples E2 and E3, respectively. Additionally, sample E1 also had significantly decreased relative change in tensile strength after water aging for 250 hours (17.9%), relative to samples E2 (18.8%) and E3 (22.4%). With respect to tensile elongation, similar results were obtained. For example, sample E1 had a significantly decreased relative change in tensile elongation after water aging for 250 hours (23.5%), relative to samples E2 (33.3%) and E3 (28.3%). After 500 hours of water aging, sample E1 had a reduced relative change in tensile elongation (17.6%), relative to samples E2 (33.3%) and E3 (25%). Similar results were obtained after 1000 hours of water aging.

The embodiments above are intended to be illustrative and not limiting. Additional embodiments are within the inventive concepts. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

The invention claimed is:

1. A polyphenylene sulfide ("PPS") polymer compositions comprising:
   a low MFR PPS polymer having a melt flow rate of no more than 170 g/10 min.;
   E-CR glass fiber and;
   optionally, a high MFR PPS polymer having a melt flow rate of at least 700 g/10 min. wherein
   melt flow rate is measured at 316° C. using a 5 kg weight according to ASTM D1238B;
   the EC-R glass fiber is a boron-free modified E-Glass fiber according to ASTM D578/D578M-05 (2011) and the E-CR glass fiber comprises a boron concentration of less than 0.5 wt. %, relative to the total weight of the glass fiber.

2. The PPS polymer composition of claim 1, wherein the low MFR PPS polymer has a melt flow rate of no more than 150 g/10 min.

3. The PPS polymer composition of claim 1, wherein the total concentration of the low MFR PPS polymer and high MFR PPS polymer is at least 30 wt. % and no more than 65 wt. %, relative to the total weight of the PPS polymer composition.

4. The PPS polymer composition of claim 1, comprising the high MFR PPS polymer.

5. The PPS polymer composition of claim 4, wherein the high MFR PPS polymer has a melt flow rate of at least 900 g/10 min.

6. The PPS polymer composition of claim 4, wherein the ratio of the concentration of the low MFR PPS polymer to the high MFR PPS polymer is from 1:1 to 3:1.

7. The PPS polymer composition of claim 1, wherein the concentration of the E-CR glass fiber is from 30 wt. % to 60 wt. %, relative to the total weight of the PPS polymer composition.

8. The PPS polymer composition of claim 1, wherein E-CR glass fiber comprises less than 0.05 wt. % of boron, relative to the total weight of the E-CR glass fiber.

9. The PPS polymer composition of claim 1, wherein the E-CR glass fiber comprises titanium dioxide having a concentration of at least 0.1 wt. % and no more than 0.25 wt. %, relative to the total weight of the E-CR glass fiber.

10. The PPS polymer composition of claim 1, wherein the E-CR glass fiber comprises potassium having a concentration of at least 0.2 wt. % and no more than 0.5 wt. %, relative to the total weight of the E-CR glass fiber.

11. The PPS polymer composition of claim 1, wherein the E-CR glass fiber comprises:
sodium having a concentration of less than 0.5 wt. %, relative to the total weight of the EC-R glass fiber and strontium concentration of less 0.1 wt. %, relative to the total weight of the E-CR glass fiber.

12. The PPS polymer composition of claim 1, wherein the polymer composition comprises a tensile strength of at least 120 MPa.

13. The PPS polymer composition of claim 1, wherein the PPS polymer composition comprises a retention of tensile strength after 250 hours of water aging of no more than 30%.

14. The PPS polymer composition of claim 1, wherein the low MFR PPS polymer and high MFR PPS polymer each comprise at least 50 mol % of a recurring unit (RPPS) according to the following formula:

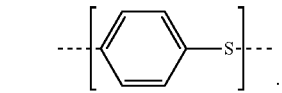

15. An article comprising the PPS polymer composition of claim 1, wherein the article is selected from the group consisting of the group consisting of a water pump, a water meter, a faucet, a valve, a manifold, a spout, a pipe and an automotive fluid reservoir.

16. The PPS polymer composition of claim 1, wherein the PPS polymer composition consists essentially of:
the low MFR PPS polymer;
the E-CR glass fiber;
optionally, the high MFR PPS polymer; and
optionally, at least one additive selected from the group consisting of reinforcing fillers; lubricants; processing aids; plasticizers; flow modifiers; flame retardants; anti-static agents; extenders; pigments, dyes or colorants; and metal deactivators.

* * * * *